United States Patent [19]
Mumick et al.

[11] Patent Number: 6,006,207
[45] Date of Patent: Dec. 21, 1999

[54] SYSTEM AND METHOD FOR LOAN PREPAYMENT DISCOUNTS

[76] Inventors: Ravneet Kaur Mumick; Inderpal Singh Mumick, both of 85 Swenson Cir., Berkeley Heights, N.J. 07922

[21] Appl. No.: 09/061,902

[22] Filed: Apr. 17, 1998

[51] Int. Cl.[6] .................................................... G06F 17/60
[52] U.S. Cl. ................................ 705/38; 705/26; 705/35
[58] Field of Search .................................. 705/38, 26, 35

[56] References Cited

U.S. PATENT DOCUMENTS

| | | | |
|---|---|---|---|
| 4,876,648 | 10/1989 | Lloyd | 705/38 |
| 5,732,400 | 3/1998 | Mandler et al. | 705/26 |
| 5,742,775 | 4/1998 | King | 705/38 |
| 5,870,720 | 2/1999 | Chusid et al. | 705/38 |

OTHER PUBLICATIONS

'Ipac Mortgage Holdings Inc. Announces First Quarter of 1999 Net Earnings of $6.2 Million Compared With Fourth Quarter of 1998 Net Loss of $8.1 Million', Business Wire, p0321, Apr. 29, 1999.

Miller, John U., 'The Pricing of GNMA Modified Passthrough Securities: The Multiperiod Valuation of Stochastic Mortgage Payments', vol. 46/11–A of Dissertation Abstracts International , p. 3405, 1984.

'Strong Housing Turnover Favors Discount POS (Sales of existing homes are still strong and are predicted to remain high due to low mortgage rates)', Mortgage–Backed Securities Letter, v13 , n 23, p 10+ , Jun. 8, 1998.

'House Legislation Helps Co–Ops', Electric Utility Week, p. 10, Jun. 8, 1992.

*Primary Examiner*—Allen R. MacDonald
*Assistant Examiner*—Akiba Robinson-Boyle
*Attorney, Agent, or Firm*—Morgan & Finnegan LLP

[57] ABSTRACT

A method and system of implementing a loan in a billing system includes memory storing information relating to the loan, the information including a principal balance of the loan, a term of the loan, and an interest rate of the loan. A prepayment amount that is a portion of the principal balance of the loan is selected. A present value of the prepayment amount is determined and a discount amount is selected. A discounted prepayment amount is determined based on the prepayment amount and the present value of the prepayment amount. The discount amount may be less than, equal to or greater than the difference between the prepayment amount and the present value of the prepayment amount. The discount amount may be greater than the difference, for example, for promotional purposes. A discounted prepayment amount that is the prepayment amount less the discount amount is determined and a discounted prepayment offer is transmitted to the customer of the loan, the discounted prepayment offer including an indication of the discounted prepayment amount. The discounted prepayment is received from the customer of the loan and the prepayment amount is deducted from the principal balance of the loan.

24 Claims, 4 Drawing Sheets

SYSTEM AND METHOD FOR LOAN PREPAYMENT DISCOUNTS

FIELD OF THE INVENTION

The present invention relates to a system and method for discounting prepayments of portions of consumer and business loans.

BACKGROUND OF THE INVENTION

Long-term fixed interest rate loans are a very common type of financial instrument. The most common example of such loans are home mortgage loans. Many home loans are based upon fixed interest rates and have a repayment period of 10 years or more. Many automobile loans are also based upon fixed interest rates, though the repayment periods are generally shorter, typically 3–5 years.

A fixed interest loan represents an inherent risk for a bank or other lending institution. Market interest rates may fluctuate up or down from the interest rate locked in by the consumer at the time the loan is made. When market interest rates go down, the lending institution stands to make money if the consumer continues to hold the loan. However, consumers are likely to refinance in this situation, and thus, prepay the loan in its entirety.

When interest rates go up, the lending institution stands to lose money. In this situation, a consumer will likely not refinance a loan, so prepayment through refinancing will not often occur. Some customers will prepay the loan because they have sold the financed real estate, but most loans will not be prepaid in this way.

It would be useful for a loan holder to have a way to induce customers to prepay portions of loan balances when interest rates have risen and are higher than the interest rates on the customer's loans.

SUMMARY OF THE INVENTION

The present invention is a method and system of implementing a loan that provides a way for loan holders to induce customers to prepay portions of loan balances when interest rates are higher than the loan interest rates. Customers are offered discounts, or may request discounts, on prepayment amounts, which provides an incentive for the customers to make the prepayments.

The prepayment discount offers are generated in a billing system and transmitted to the customers. A customer accepts an offer by making a discounted prepayment, which is received by the billing system and the full prepayment is credited to the customer's loan balance.

The billing system includes memory storing information relating to the loan, the information including a principal balance of the loan, a term of the loan, and an interest rate of the loan. A prepayment amount that is a portion of the principal balance of the loan is selected. A present value of the prepayment amount is determined and a discount amount is selected. A discounted prepayment amount is determined based on the prepayment amount and the present value of the prepayment amount. The discount amount may be less than, equal to or greater than the difference between the prepayment amount and the present value of the prepayment amount. The discount amount may be greater than the difference, for example, for promotional purposes.

The discounted prepayment offer is transmitted to the customer of the loan and includes an indication of the discounted prepayment amount. If the customer accepts the prepayment offer, (s)he then sends in a prepayment amount. The discounted prepayment is received from the customer of the loan and the prepayment amount is deducted from the principal balance of the loan.

In one embodiment, before the discounted prepayment is determined and offered to the customer, it is determined whether a current interest rate is greater than the interest rate of the loan. In another embodiment, a greater loan origination fee, loan discount, or loan interest rate is charged when the loan is originated, in return for allowing a loan customer the option of a prepayment discount.

BRIEF DESCRIPTION OF THE DRAWING

The details of the present invention, both as to its structure and operation, can best be understood by referring to the accompanying drawings, in which like reference numbers and designations refer to like elements.

DETAILED DESCRIPTION OF THE INVENTION

Figure 1:
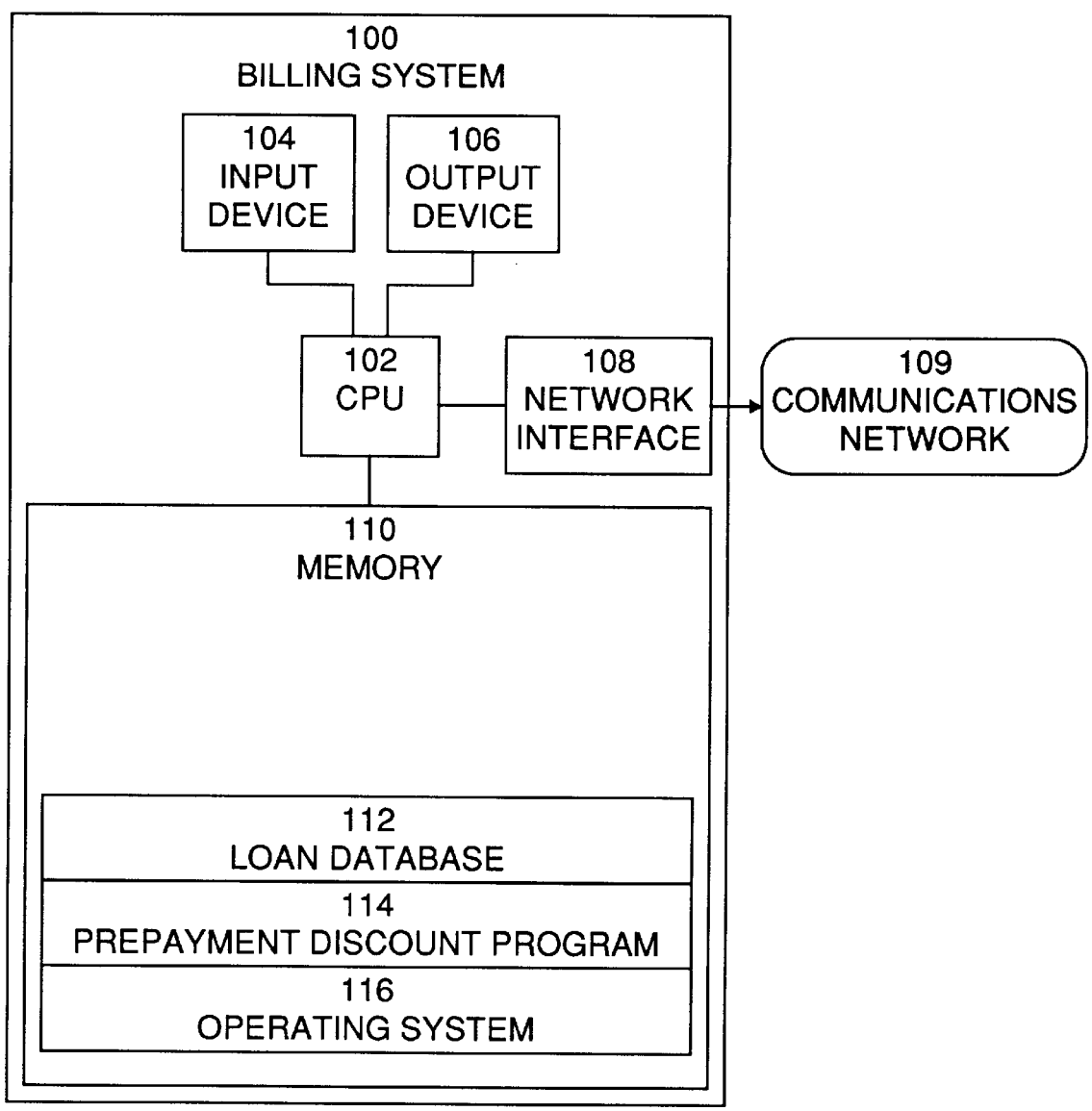
FIG. 1 is a block diagram of a billing system, according to the present invention.

In accordance with the present invention, a prepayment discount is determined and offered to a customer who chooses to prepay at least a portion of the remaining balance of a loan. In this application, the term loan refers to a fixed-term, fixed-interest loan, such as a mortgage or to any variant that has some fixed or capped interest component. For example, such a loan may be fixed for some years, and is variable afterwards, or may be variable, but for which the increases are capped in some way. For the purposes of describing the present invention, we will concentrate on the fixed part only. The fixed interest rate for the loan held by a customer is denoted f. The current interest rate or cost of funds to the loan holder is denoted m. In order to reduce the loan balance by a prepayment amount x, the customer is offered the opportunity to pay the amount x-d. Thus, d is the prepayment discount amount.

In order to determine the prepayment discount amount, a prepayment amount x is selected, then the mortgage holder (bank) must determine the present value of the prepayment amount x, if the bank were to leave the amount x invested in the current loan with the customer, and get an interest rate of f on the loan amount x.

The present value of x is denoted by PV(x).

Since the customer's interest rate is f, the monthly interest paid by the customer on the prepayment amount x, is fx/12. For simplicity, let us assume that if the customer continues to hold the loan for now, (s)he will pay off the amount x in one lump sump payment of x after n months. In actuality, the amount x may be paid back over several months towards the end of the loan term, and the equations for that case, while more involved, follow from the equations derived for our simpler case, as is well known.

In our scenario, the bank gets a cash flow of $ fx/12 every month for n months, followed by a cash flow of $ x after n months. The bank will discount this cash flow by the current interest rate of m, to arrive at the present value, PV(x), given by the equation:

$$PV(x) = fx/12/(1+m/12)^0 + fx/12/(1+m/12)^1 + fx/12/(1+m/12)^2 + \ldots + fx/12/(1+m/12)^{n-1} + x/(1+m/12)^n.$$

The difference between the prepayment amount x and present value of the prepayment amount, if left invested in the mortgage, PV(x), is determined:

$$a = x - PV(x).$$

The prepayment discount that is offered to the customer is based on the difference a. While the offered prepayment discount is typically a portion of the difference a, the offered discount may be equal to or greater than the difference a.

For example, consider a 30 year fixed mortgage for $100,000 at 7.5% interest, issued in January, 1996. The monthly payment is $699.21. Assume that the interest rates for such mortgages have, by January, 2000, increased to 9.0%. The mortgage balance at this time is $95,860.00.

A prepayment amount of $1000.00 is selected. The present value of this $1000.00, if left invested in the mortgage, is calculated. If $1000 was left invested in the mortgage, it would generate a monthly cash flow of $6.25 (7.5% of $1000, spread over 12 months), and a final cash flow of $1000 at the end of 26 years. The present value of this cash flow, when discounted at 9%, is approximately $850. The difference between the prepayment amount and the present value of the prepayment amount is $150. The customer may be offered a portion of this difference, such as $50.00, as a discount. The customer is offered the opportunity to prepay $1000.00 of the principal of the loan by paying only $950.00, the prepayment amount less the discount. Alternatively, the customer may be offered a discount that is equal to or greater than the difference, such as, in this example, $150.00 or $200.00. This would typically be done for promotional purposes.

A billing system 100, according to the present invention, is shown in FIG. 1. Billing system 100 includes central processing unit (CPU) 102, which is connected to input device 104, output device 106, network interface 108 and memory 110. CPU 102 may comprise a microprocessor, for example, an INTEL PENTIUM processor, or CPU 102 may comprise a mini-computer or mainframe processor. Input device 104 allows input information to be entered and may comprise a keyboard, a floppy disk drive, a tape drive, or other removable media drive or interchange device. Output device 106 allows bills to be produced based on billing information generated by billing system 100 and typically comprises a high-speed printer. Network interface 108 couples billing system 100 to communications network 109 and allows an alternate path for input of data or output of billing information. Communications network 109 may be, for example, a local or wide area network, the public switched telephone network, or the Internet. Network interface 108 may comprise, a conventional modem or local/wide area network adapter, depending upon communications network 109. Memory 110 may include devices such as random access memory or read only memory, which store data and instructions for execution by CPU 102. Memory 110 may also include devices such as magnetic disk drives, optical disk drives and tape drives, which store data and program instructions used by the present invention.

Memory 110 includes loan database 112, prepayment discount program 114, and operating system 116. Loan database 112 stores information about loan for which bills are to be processed by billing system 100. Prepayment discount program 114 comprises program instructions that are executed by CPU 102, in order to carry out the present invention.

Figure 2A:
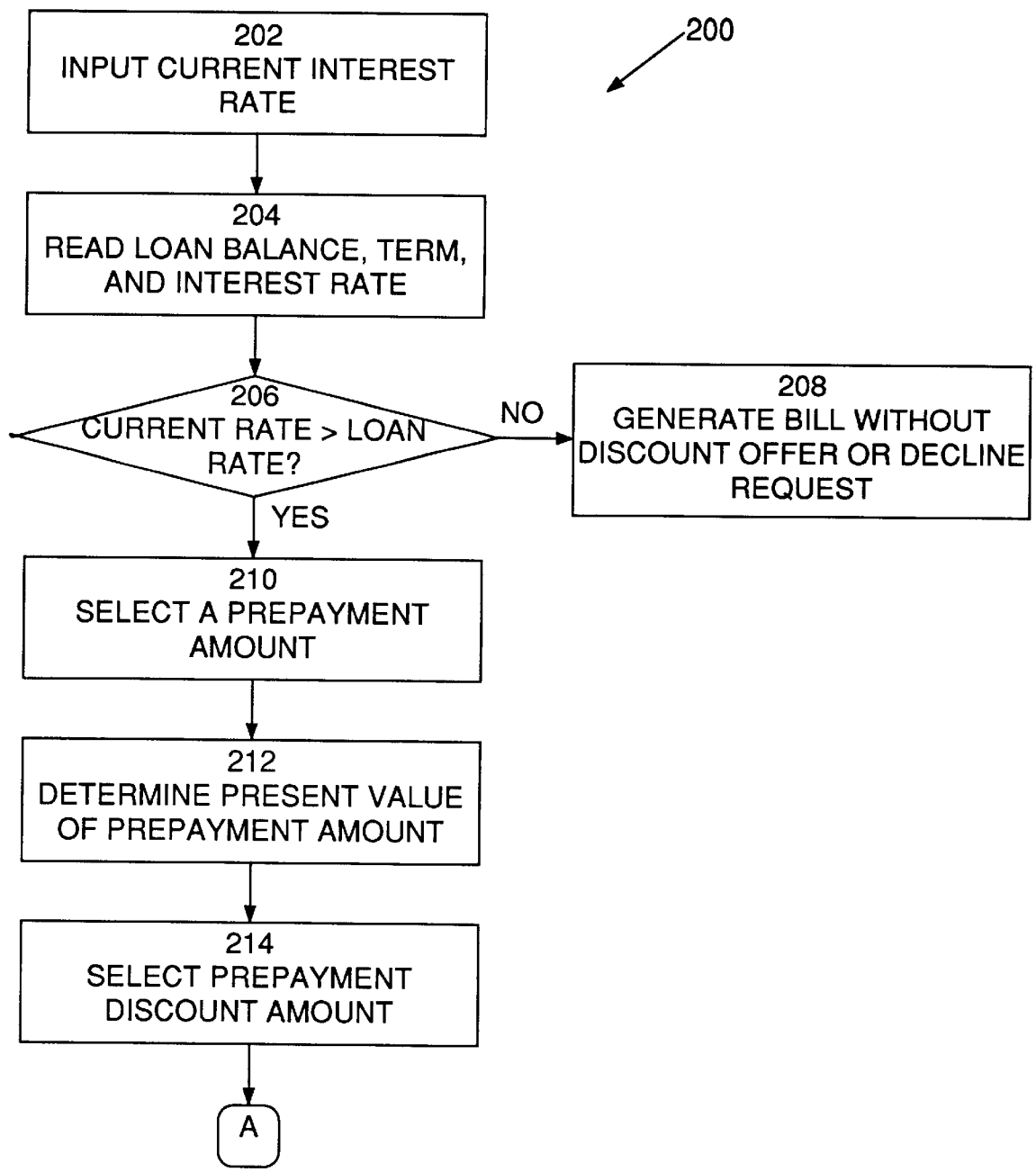
FIGS. 2a and 2b are flow diagrams of a loan billing generation process, which is implemented in the billing system of FIG. 1.
Figure 2B:
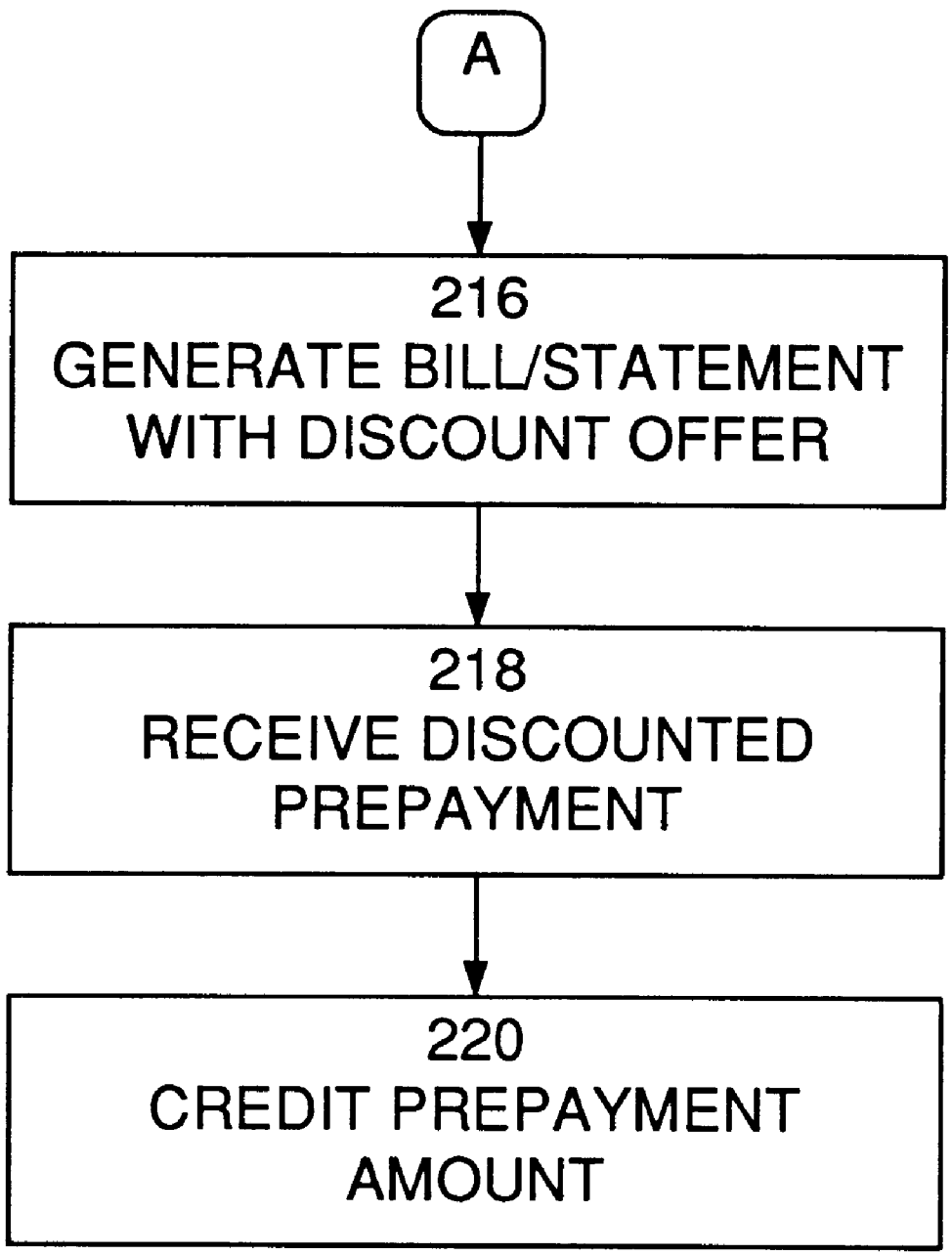

A loan billing generation process 200, that is implemented in the billing system of FIG. 1, is shown in FIG. 2. Process 200 may be initiated in response to several actions. Typically, the loan holder will observe that interest rates are rising and decide to offer prepayment discounts to at least a portion of their loan customers. The loan holder will then perform process 200 for those customer accounts and offer prepayment discounts as determined by the process. The prepayment discount offers may be included on regular loan bills, or they may be presented separately, by, for example, mailed flyers, e-mail, fax, or telephone.

Alternatively, loan customers may request a prepayment discount from the loan holder. Typically, this will be in response to advertisements or announcements from the loan holder that such discounts are available. The loan customers may make written requests, telephone requests, e-mail requests, or delayed or real-time on-line requests, such as over the Internet. Process 200 may be initiated in response to such a request. In response to a written or telephone request, a person, such as a customer service agent, will typically initiate, and possibly perform, process 200. Responses to email or online requests may be initiated manually or automatically, but are typically performed automatically.

Process 200 begins with step 202, in which the current interest rate is input for the type of loan being processed. The current interest rate may be manually entered or it may be automatically entered, for example, through network interface 112. The current interest that is used may be the loan holder's current cost of funds, market interest rate, federal funds rate, a composite rate, or a rate determined by any other method deemed appropriate by the loan holder.

In step 204, terms of the particular loan being processed, such as the loan balance, term and interest rate, are read from storage device 114. In step 206, the current interest rate is compared with the loan rate. If the current rate is not greater than the loan rate, the process continues with step 208, in which billing system 100 generates a bill that does not include a prepayment discount offer or declines a customer request for a prepayment discount. If the current rate is greater than the loan rate, the process continues with step 210, in which a prepayment amount is selected.

Typical prepayment amounts, which may be selected, include: a fixed amount, a percentage of the remaining loan balance, an amount based on the principal payment amount of the current loan payment, an amount based on the total payment amount of the current loan payment, and an amount requested by the customer. In addition, several prepayment amounts may be selected, a range of prepayment amounts may be selected, or several ranges of prepayment amounts may be selected.

Although steps 206–210, in which a prepayment discount is offered only if the current interest rate is greater than the loan rate, are preferred, in other embodiments, prepayment discounts may be offered even if the current interest rate is equal to or even less than the loan rate. For example, at the time the loan was originated, the loan customer may have paid more points (loan origination fee, loan discount, or both), or agreed to a higher interest rate in exchange for the option of obtaining prepayment discounts when desired. As another example, when interest rates are falling, many customers may refinance their loans. In this situation, prepayment discounts may be offered to loan customers as an alternative to refinancing.

In another embodiment, prepayment discounts may be offered only if the current interest rate is greater than the loan rate be at least a certain threshold amount. This threshold amount would typically be determined based on the total costs of the prepayment offers, including the costs of generating the offers and receiving the acceptances, as well as the cost or profit involved in the prepayment itself. In some cases, the costs involved may be greater than the profit, or the net profit may be too small to bother with.

In step 212, the present value of each selected prepayment amount is determined based on the current market interest rate, the loan interest rate and the loan term. In step 214, a prepayment discount amount is selected. The prepayment discount is based on the difference between the prepayment amount and the present value of the prepayment amount.

The prepayment discount may be a percentage of the difference or it may be a fixed amount greater or less than the difference. If several prepayment amounts have been selected, the prepayment discount percentage may vary. For example, if prepayment amounts of $100, $200 and $500 have been selected, prepayment discount percentages of 10%, 20% and 50%, respectively, may be applied.

In step 216, a bill or statement including the prepayment discount offer is generated. Typically, the bill or statement is printed and mailed to the loan customer. Alternatively, the bill or statement may be electronically delivered, for example, over communications network. If the loan service includes regular bills or statements that are sent to the customer, the prepayment discount offer is typically included on the regular bill. If the loan service does not include regular bills or statements, such as loans that have a payment book issued at the beginning of the loan, the prepayment discount offer is then sent separately.

The customer who receives the prepayment discount offer may, at their option, pay one of the discounted prepayment amounts, or may enquire about other prepayment options. If the prepayment discount offer is included with a regular bill or statement, the prepayment amount would be in addition to the regular loan payment. In step 218, billing system 218 receives the discounted prepayment amount. In step 220, the prepayment amount, which is greater than the discounted prepayment amount, is credited to the loan, reducing the principal balance by the entire prepayment amount.

Figure 3:
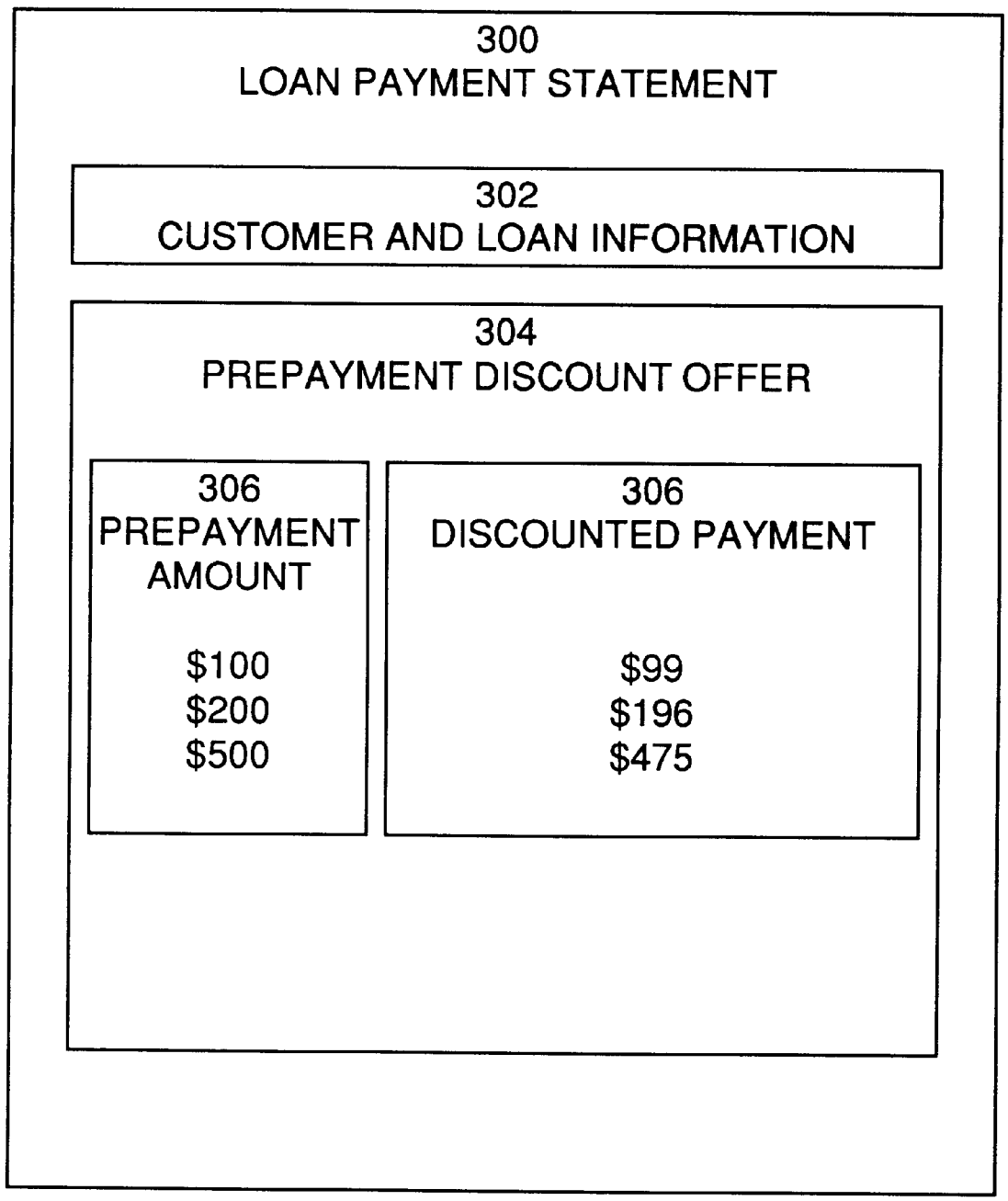
FIG. 3 is an exemplary loan payment statement generated by the loan billing process of FIGS. 2a and 2b.

An exemplary loan payment statement 300 is shown in FIG. 3. Loan payment statement 300 includes customer and loan information 302 and prepayment discount offer 304. Customer and loan information 302 may include customer information, such as the customer name and address, and loan information, such as the loan principal balance, etc. Prepayment discount offer includes prepayment amount 306 and discounted payment 306. Discounted payment 306 indicates one or more amounts that the customer may pay. Prepayment amount 306 indicates, for each discounted payment, a corresponding amount by which the loan principal balance will be reduced. For example, FIG. 3 indicates discounted payments of $99.00, $196.00 and $475.00. If the customer pays $99.00, the loan principal balance will be reduced by $100.00. Thus, the customer's discount is $1.00. Likewise, if the customer pays $196.00, the loan principal balance will be reduced by $200.00, for a discount of $4.00, or if the customer pays $475.00, the loan principal balance will be reduced by $500.00, for a discount of $25.00.

Loan payment statement 300 would typically be printed on paper and mailed to a loan customer. However, alternate embodiments are possible. For example, a special flyer including some or all of the information of loan payment statement 300, but including at least the prepayment discount offer information 304 may be generated. Alternatively, loan payment statement 300, or at least prepayment discount offer 304, may be transmitted electronically, for example, over the Internet, as e-mail or as a web page. Such an electronic transmission may be displayed to the recipient on a display screen, such as a monitor or liquid crystal display connected to a computer or display terminal, or the electronic transmission may be printed by the recipient.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of implementing by a computer, a loan in a computer system comprising memory, the memory storing information relating to the loan, the information including a principal balance of the loan, a term of the loan, and an interest rate of the loan, the method comprising the steps of:
   selecting a prepayment amount that is a portion of the principal balance of the loan;
   determining a present value of the prepayment amount;
   determining a discounted prepayment amount based on the prepayment amount and the present value of the prepayment amount;
   transmitting a discounted prepayment offer to the customer of the loan, the discounted prepayment offer including an indication of the discounted prepayment amount;
   receiving the discounted prepayment from the customer of the loan; and
   deducting the prepayment amount from the principal balance of the loan.

2. The method of claim 1, wherein the step of determining a discounted prepayment amount comprises the steps of:
   selecting a discount amount; and
   determining a discounted prepayment amount that is the prepayment amount less the discount amount.

3. The method of claim 2, wherein the discount amount is less than the difference between the prepayment amount and the present value of the prepayment amount.

4. The method of claim 2, wherein the discount amount is equal to the difference between the prepayment amount and the present value of the prepayment amount.

5. The method of claim 2, wherein the discount amount is greater than the difference between the prepayment amount and the present value of the prepayment amount.

6. The method of claim 1, further comprising the steps of:
   receiving a current interest rate;
   determining whether the current interest rate is greater than the interest rate of the loan;
   if the current interest rate is greater than the interest rate of the loan, performing the steps of claim 1.

7. The method of claim 1, further comprising the step of:
   charging a greater loan origination fee, loan discount, or interest rate when the loan is originated, in return for allowing a loan customer the option of a prepayment discount.

8. The method of claim 1, wherein the loan is a home mortgage, an automobile loan, or a business loan.

9. A system for implementing by a computer a loan, the system comprising:
   a computer system comprising:
     a processor; and
     a memory storing information relating to the loan, the information including a principal balance of the loan, a term of the loan, and an interest rate of the loan, and program instructions executable by the processor for performing the steps of:
       selecting a prepayment amount that is a portion of the principal balance of the loan;
       determining a present value of the prepayment amount;
       determining a discounted prepayment amount based on the prepayment amount and the present value of the prepayment amount;
       transmitting a discounted prepayment offer to the customer of the loan, the discounted prepayment offer including an indication of the discounted prepayment amount;
       receiving the discounted prepayment from the customer of the loan; and
       deducting the prepayment amount from the principal balance of the loan.

10. The system of claim 9, wherein the program instructions executable by the processor for performing the step of determining a discounted prepayment amount comprises program instructions for performing the steps of:

selecting a discount amount; and determining a discounted prepayment amount that is the prepayment amount less the discount amount.

11. The system of claim 10, wherein the discount amount is less than the difference between the prepayment amount and the present value of the prepayment amount.

12. The system of claim 10, wherein the discount amount is equal to the difference between the prepayment amount and the present value of the prepayment amount.

13. The system of claim 10, wherein the discount amount is greater than the difference between the prepayment amount and the present value of the prepayment amount.

14. The system of claim 9, wherein the program instructions executable by the processor further comprise program instructions for performing the steps of:

receiving a current interest rate;

determining whether the current interest rate is greater than the interest rate of the loan;

if the current interest rate is greater than the interest rate of the loan, performing the steps of claim 9.

15. The system of claim 9, wherein the program instructions executable by the processor further comprise program instructions for performing the step of:

charging a greater loan origination fee, loan discount, or interest rate when the loan is originated, in return for allowing a loan customer the option of a prepayment discount.

16. The system of claim 9, wherein the loan is a home mortgage, an automobile loan, or a business loan.

17. A computer program storage device, for use in a billing system comprising a processor and a memory storing information relating to a loan, the information including a principal balance of the loan, a term of the loan, and an interest rate of the loan, the computer program storage device containing program instructions executable by the processor for performing the steps of:

selecting a prepayment amount that is a portion of the principal balance of the loan;

determining a present value of the prepayment amount;

determining a discounted prepayment amount based on the prepayment amount and the present value of the prepayment amount;

transmitting a discounted prepayment offer to the customer of the loan, the discounted prepayment offer including an indication of the discounted prepayment amount;

receiving the discounted prepayment from the customer of the loan; and deducting the prepayment amount from the principal balance of the loan.

18. The computer program storage device of claim 17, wherein the program instructions for performing the step of determining a discounted prepayment amount comprise program instructions for performing the steps of:

selecting a discount amount; and determining a discounted prepayment amount that is the prepayment amount less the discount amount.

19. The computer program storage device of claim 18, wherein the discount amount is less than the difference between the prepayment amount and the present value of the prepayment amount.

20. The computer program storage device of claim 18, wherein the discount amount is equal to the difference between the prepayment amount and the present value of the prepayment amount.

21. The computer program storage device of claim 18, wherein the discount amount is greater than the difference between the prepayment amount and the present value of the prepayment amount.

22. The computer program storage device of claim 17, further comprising program instructions for performing the steps of:

receiving a current interest rate;

determining whether the current interest rate is greater than the interest rate of the loan;

if the current interest rate is greater than the interest rate of the loan, performing the steps of claim 1.

23. The computer program storage device of claim 17, further comprising program instructions for performing the steps of:

charging a greater loan origination fee, loan discount, or interest rate when the loan is originated, in return for allowing a loan customer the option of a prepayment discount.

24. The computer program storage device of claim 17, wherein the loan is a home mortgage, an automobile loan, or a business loan.

* * * * *